US012313038B2

United States Patent
Zhu

(10) Patent No.: US 12,313,038 B2
(45) Date of Patent: May 27, 2025

(54) METHOD FOR OPTIMIZING WIND FARM ELECTRIC POWER GENERATION USING MULTIVARIABLE SYSTEM IDENTIFICATION

(71) Applicant: HANGZHOU TAIJI YUCAI SOFTWARE CO., LTD., Zhejiang (CN)

(72) Inventor: Yucai Zhu, Best (NL)

(73) Assignee: HANGZHOU TAIJI YUCAI SOFTWARE CO., LTD., Hangzhou (CN)

( * ) Notice: Subject to any disclaimer, the term of this patent is extended or adjusted under 35 U.S.C. 154(b) by 0 days.

(21) Appl. No.: 18/773,629

(22) Filed: Jul. 16, 2024

(65) Prior Publication Data
US 2025/0146470 A1 May 8, 2025

(30) Foreign Application Priority Data
Nov. 2, 2023 (CN) .......................... 202311448763.8

(51) Int. Cl.
F03D 7/04 (2006.01)
(52) U.S. Cl.
CPC .......... F03D 7/048 (2013.01); *F05B 2260/84* (2013.01); *F05B 2270/20* (2013.01)
(58) Field of Classification Search
CPC . F03D 7/048; F03D 7/042; F03D 7/04; F03D 7/02; F03D 7/00; F05B 2260/84;
(Continued)

(56) References Cited

U.S. PATENT DOCUMENTS

| 2013/0166082 A1* | 6/2013 | Ambekar | G05B 13/041 |
| | | | 700/287 |
| 2013/0300115 A1* | 11/2013 | Seem | F03D 7/048 |
| | | | 290/44 |

(Continued)

FOREIGN PATENT DOCUMENTS

| CN | 101587328 A | 11/2009 |
| CN | 113033012 A | 6/2021 |

(Continued)

OTHER PUBLICATIONS

First Office Action(CN202311448763.8); Date of Mailing: Apr. 4, 2024.

(Continued)

*Primary Examiner* — Mohamed Charioui
(74) *Attorney, Agent, or Firm* — Wiersch Law Group

(57) ABSTRACT

A method for optimizing wind farm electric power generation using multivariable system identification, which reduces energy loss caused by the wind turbine wake effect by optimizing and adjusting the yaw angle and axial induction factor of each wind turbine, so as to maximize the total power generation of the wind farm. According to the method, accurate optimization gradient estimates are obtained by using the experimental data and the identification model, and then a gradient-ascend optimization with large initial step size and variable step size iteration is carried out, so that the problems of large model errors and of high computation cost of mechanism modeling are avoided. The method is easy to implement and has a high modeling accuracy and efficiency, and thus is suitable for solving the electric power generation optimization problem of large-scale real-life wind farms.

8 Claims, 7 Drawing Sheets

(58) Field of Classification Search
CPC .............. F05B 2260/00; F05B 2270/20; F05B 2270/10; F05B 2270/00
See application file for complete search history.

(56) References Cited

U.S. PATENT DOCUMENTS

| | | |
|---|---|---|
| 2017/0198680 A1* | 7/2017 | Wu .................. F03D 7/046 |
| 2021/0054826 A1 | 2/2021 | Grunnet et al. |
| 2023/0175481 A1* | 6/2023 | Mirzaei ................ F03D 7/0204 700/287 |

FOREIGN PATENT DOCUMENTS

| | | |
|---|---|---|
| CN | 114625009 A | 6/2022 |
| KR | 102394148 B1 | 5/2022 |

OTHER PUBLICATIONS

Notice Of Allowance(CN202311448763.8); Date of Mailing: May 2, 2024.
Data-driven-Cooperative-Control-Method-for-Multiple-Wind-Turbines.
A-crtical-look-at-deep-neural-network-for-dynamic-system-modeling.

* cited by examiner

METHOD FOR OPTIMIZING WIND FARM ELECTRIC POWER GENERATION USING MULTIVARIABLE SYSTEM IDENTIFICATION

CROSS-REFERENCE TO RELATED APPLICATIONS

The present application claims priority to Chinese Patent Application No. 202311448763.8, filed on Nov. 2, 2023, the content of which is incorporated herein by reference in its entirety.

TECHNICAL FIELD

The present disclosure belongs to the field of automatic control and operation optimization of wind electric power generation, and relates to a method for optimizing wind farm electric power generation using multivariable system identification.

BACKGROUND

Wind turbine generator systems (will be called wind turbines later for simplicity) in wind farms are electric power generation devices that convert wind energy in the air into electric energy. When the upstream wind turbine is running, it will extract energy from the wind and convert it into electric energy, and at the same time, it will form an airflow wake area behind. The wind turbine blades extract some wind energy, and thus the wind speed in the wake will be lower than the initial wind speed. At the same time, due to the turbulence caused by the movement of the rotor blades, the turbulence intensity in the wake will also increase. This phenomenon is called a wake effect for short, and its existence reduces the performance and output power of the subsequent wind turbines.

In order to reduce the influence of the wake effect and improve the overall electric power generation of wind farms, industry and academia have done a lot of research and experiments, and put forward various methods. For some documents, see literatures [1],[2],[3],[4],[5],[6],[7],[8]. In literature[5], it is pointed out that for different wind directions and speeds, the annual energy output of wind farms can be increased by 1.86% to 6.24% through wake optimization; in the literature [6], through a simulation study of an offshore wind farm case, it shows that wake optimization can improve the annual energy output of the wind farm by more than 4%. The existing research work puts forward two main methods to reduce the wake effect to improve the overall electric power generation of the wind farm. The first method is to introduce an off-set to the yaw angle of the wind turbine to reduce its wake effect; the second is to reduce the axial induction factor of the wind turbine (reducing the electric power generation of the wind turbine) to reduce its wake effect. Changing the axial induction factor of the wind turbine is realized by adjusting the blade angle of the wind turbine or the torque of the generator.

At present, the technical route to study the optimization of wind farm is mainly based on the mechanism models of aerodynamics, such as CFD (computational fluid dynamics) method, see literatures [2],[3],[4],[5],[6]. However, for a given wind farm, there are many difficulties in applying the wake optimization method based on the mechanism model: (1) high modeling cost, (2) low model accuracy and (3) high calculation cost. Although there are some model-free wind field optimization methods, see literatures[7],[8], these methods assume too strong conditions and do not conform to the real wind farm. Therefore, most of the existing wind farms do not use any total energy optimization technology, and only consider the maximum electric power generation mode under the condition of a single machine set without the wake effect, that is, the yaw angle of each wind turbine is 0°; the axial induction factor of each wind turbine is set to the maximum value (about 0.33). This setting is called a greedy operation method. However, the maximum electric power generation of a single wind turbine without wake cannot make the overall electric power generation of the wind farm maximum. In order to improve the overall electric power generation of wind farms, it is an urgent technical challenge to provide a wind farm electric power generation optimization (wake optimization) method that has a strong applicability and can be implemented in full-scale wind farms.

[1] M. Steinbuch, W. D. Boer, O. Bosgra (1988). Optimal control of wind power plants. Journal of Wind Engineering and Industrial Aerodynamics, Vol. 27, pp. 237-246.
[2] A. C. Kheirabadi, R. Nagamune (2019). A quantitative review of wind farm control with the objective of wind farm power maximization. Journal of Wind Engineering & Industrial Aerodynamics, Vol. 192, pp. 45-73.
[3] L. A. Martinez-Tossas, J. Annoni, P. A. Fleming, M. J. Churchfield (2019). The aerodynamics of the curled wake: a simplified model in view of flow control. Wind Energy Science, Vol. 4, pp. 127-138.
[4] W. Husien, W. El-Osta, E. Dekam (2013). Effect of the wake behind wind rotor on optimum energy output of wind farms. Renewable Energy, Vol. 49, pp. 128-132.
[5] M. De-Prada-Gil, C. G. Alias, O. Gomis-Bellmunt, A. Sumper (2015). Maximum wind power plant generation by reducing the wake effect. Energy Conversion and Management, Vol. 101, pp. 73-84.
[6] P. Gebraad, J. J. Thomas, A. Ning, P. Fleming, K. Dykes (2016). Maximization of the annual energy production of wind power plants by optimization of layout and yaw-based wake control. Wind Energy, 2016, Vol. 20, pp. 97-107.
[7] J. R. Marden, S. D. Ruben, L. Y Pao (201). A model-free approach to wind farm control using game theoretic methods. IEEE Transactions on Control Systems Technology 2013; Vol. 21, pp. 1207-1214.
[8] P. M. Gebraad, J. W. van Wingerden (2015). Maximum power-point tracking control for wind farms. Wind Energy Vol. 18, pp. 429-447.
[9] Y C. Zhu (2001). Multivariable System Identification for Process Control, Elsevier, Oxford.

SUMMARY

In order to reduce the mutual interference and power loss caused by the wake effect between wind turbines, improve the utilization efficiency of wind energy, and thus improve the overall electric power generation of the wind farm, the present disclosure provides a method for optimizing wind farm electric power generation using multivariable system identification.

The object of the present disclosure is achieved through the following technical solution: a method for optimizing wind farm electric power generation using multivariable system identification, including:

Constructing an optimization model by taking yaw angles and axial induction factors of all wind turbines in a wind farm as optimization (decision) variables and the total electric power (will be called power later for simplicity) generation of the wind farm as an objective function.

Applying excitation signals to the setpoints of the yaw angles and axial induction factors of all wind turbines, collecting experimental data, obtaining a linear dynamic model of the optimization model by using a system identification method, taking the model gains between the yaw angles and axial induction factors of wind turbines and the total power generation in the dynamic linear model as gradients for optimization, performing optimization iteration by using a gradient ascent method, and optimally adjusting the yaw angle and axial induction factor of the wind turbine.

Further, the wind speed and the wind direction are taken as measured disturbance variables in system identification, thus the inputs of the optimization model are the optimization variables and the measured disturbance variables, and the output thereof is the total power generation of the wind farm.

Further, the optimization model is a dynamic nonlinear function $P_{out}(t)=f(\theta,v,\beta,t)$, where $$\theta = \begin{bmatrix} \gamma \\ a \end{bmatrix}$$

is the vector of optimization (decision) variables, $\gamma$ is the vector of yaw angles of wind turbines, a is the vector of axial induction factors of wind turbines, v is the wind speed of the wind farm, $\beta$ is the wind direction angle of the wind farm, and t is the sampling time.

carrying out linear approximation on the dynamic nonlinear function at current working point $\theta^*$:

$$P_{out}(t) - P_{out}^* \approx G(q^{-1}, \theta^*) \underbrace{\begin{bmatrix} \theta(t) \\ v(t) \\ \beta(t) \end{bmatrix}}_{u(t)} + v(t) \quad (1)$$

where $P^*_{out}$ is a constant, with a value being the total power generation of the wind farm at the current working point; $P_{out}(t)$ represents the total power generation of the wind farm near the current working point $\theta^*$ at time t; $G(q^{-1},\theta^*)$ is a dynamic linear model of the current working point $\theta^*$, $q^{-1}$ is unit delay operator, and v(t) is an unmeasured stochastic disturbance of the system.

A gradient of $P_{out}(t)$ for $\theta(t)$ at the current working point $\theta^*$ is the static gain of the dynamic linear model $G(q^{-1},\theta^*)$, namely:

$$\frac{\partial P_{out}(t)}{\partial \theta(t)} = G(q^{-1}, \theta^*)^T |_{q=1} = G(1, \theta^*)^T \quad (2)$$

Obtaining a local optimum through iterative optimization using a gradient ascent method.

Further, a method for determining an initial step size of the optimization iteration specifically includes the following steps: dividing a distribution area of the wind turbine into a plurality of rows of areas from front to back according to an incoming wind direction, with an initial step size of the yaw angle of each area being reduced in turn, and an initial step size of the axial induction factor being the same.

Further, obtaining the dynamic linear model and the optimization gradient by using the system identification method specifically includes:

(1) Identification experiment: simultaneously applying independent random excitation signals to all optimization variables.
(2) Model identification: collecting the optimization variables where excitation signals are added, measurable disturbance variables and power generation data of the wind farm, and using the following method for the model identification:

Parameterizing the dynamic linear model as follows:

$$P_{out}(t) - P_{out}^* \approx G(q^{-1}, \theta^*) \begin{bmatrix} \theta(t) \\ v(t) \\ \beta(t) \end{bmatrix} + v(t) = \quad (3)$$

$$\frac{1}{A(q^{-1})} [B_1(q^{-1}), B_2(q^{-1}), \ldots B_{2n+2}(q^{-1})] \begin{bmatrix} \theta(t) \\ v(t) \\ \beta(t) \end{bmatrix} + \frac{C(q^{-1})}{D(q^{-1})} e(t)$$

where $A(q^{-1})$, $B_1(q^{-1})$, $B_2(q^{-1})$, ... $B_{2n+2}(q^{-1})$, $C(q^{-1})$, $D(q^{-1})$ are polynomials of $q^{-1}$, with unknown coefficients to be determined, and e(t) is an unknown white noise signal with a mean value of zero.

Determining the unknown coefficients of each polynomial in equation (3) by minimize the following loss function:

$$V = \frac{1}{N} \sum_{t=1}^{N} \left( \frac{D(q^{-1})}{C(q^{-1})} \left\{ P_{out}(t) - P_{out}^* - \frac{1}{A(q^{-1})} [B_1(q^{-1}), B_2(q^{-1}), \ldots B_{2n+2}(q^{-1})] u(t) \right\} \right)^2 \quad (4)$$

where N represents the number of data samples; and (3) Model gain error estimation: calculating an upper error bound of a frequency of each dynamic linear model according to an asymptotic identification method. A frequency response of the dynamic linear model is the model gain when the frequency is zero, and obtaining an upper error bound of the model gain. The upper error bound of the model gain represents the upper error bound of the gradient and is used to terminate the optimization iteration.

Further, the termination method of the optimization iteration specifically includes: when a gradient value of the yaw angle or the axial induction factor of a certain wind turbine is less than the upper error bound, suspending the optimization iteration; when the gradient value of the yaw angle or the axial induction factor is greater than the upper error bound in subsequent iterations, restating the optimization iteration; and when gradient values of the yaw angles or the axial induction factors of all wind turbines are less than the upper error bound, terminating the optimization iteration.

Further, a wind direction angle range and a wind speed range are divided into several partitions, respectively, determining center points of the partitions; slicing the experimental data according to the partitions, and carrying out the model identification for the experimental data of each partition, respectively; after obtaining models of all partitions included in the experimental data, carrying out the optimization iteration by using the gradient information in the models; and repeating the identification experiment, the model identification and the optimization iteration until the optimization iteration is terminated.

Further, forming optimal yaw angles and axial induction factors of all partitions of each wind turbine into an optimization table. During an optimization operation, the optimization table is used in two manners: using the optimal yaw angle and axial induction factor of the partition in the each partition, or using linear interpolations of the optimal yaw angles and axial induction factors of two partitions according to distances from the center points of two partitions for given wind direction angle and wind speed value.

Further, in order to reduce optimization variables and simplify optimization problems, the wind turbines of the wind farm may be optimized in groups, which specifically includes: for a certain wind direction, selecting each row of wind turbines perpendicular to the wind direction as a wind turbine group, taking the yaw angles of all wind turbines in each group as an optimization variable, and taking the axial induction factors of all wind turbines in each group as an optimization variable to perform adjustment together; setting the wind turbines in the last row to a greedy operation mode, these wind turbines do not participate in the electric power generation optimization of the wind farm.

The present disclosure has the following beneficial effects: the present disclosure adopts a method for optimizing wind farm power generation using multivariable system identification, which reduces energy loss caused by the wind turbine wake effect by optimizing and adjusting the yaw angle and axial induction factor of each wind turbine, thereby maximizing the total power generation of the wind farm. Compared with the related art, the present disclosure employs accurate optimization gradient estimates obtained from system identification with well-designed experiments, thus avoiding model errors inherent in mechanism modeling and high computational costs. Moreover, a fast convergent iteration scheme is developed. Consequently, the method is straightforward to implement, highly effective in modeling, and well-suited for addressing the electric power generation optimization (wake optimization) challenges in a large-scale real-world wind farm.

DESCRIPTION OF EMBODIMENTS

Figure 1:
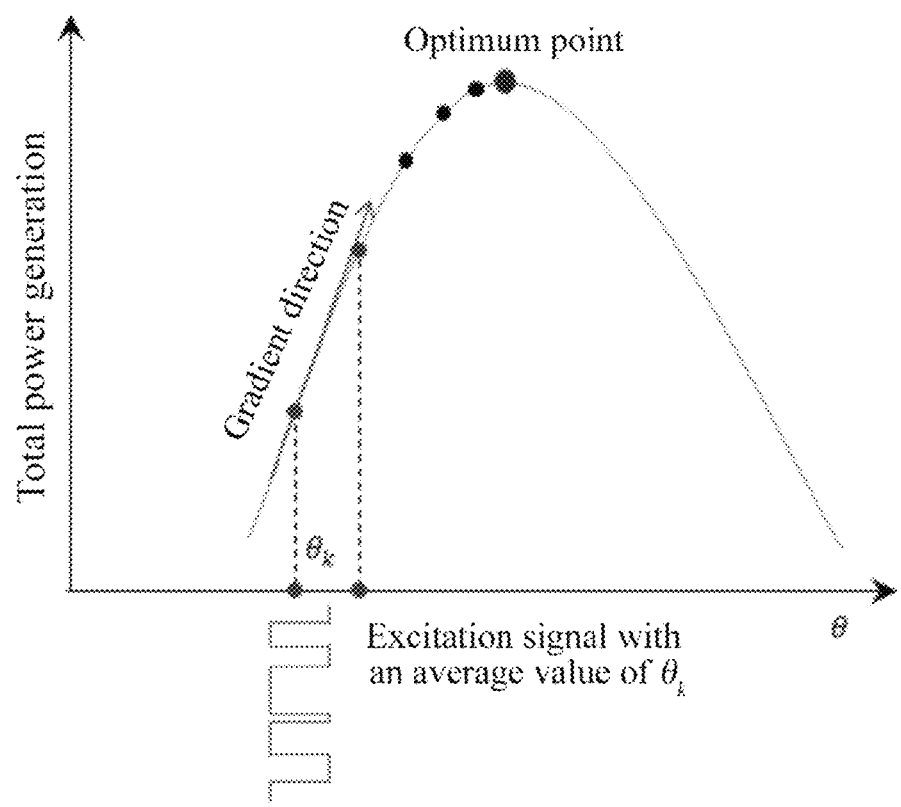
FIG. 1 is a schematic diagram of the overall electric power generation optimization of a wind farm based on a gradient ascent method.

In order to better understand the technical solution of the application, the embodiments of the application will be described in detail with the attached drawings. It should be clear that the described embodiment is only a part of the embodiment of this application, not the whole embodiment. Based on the embodiments in this application, all other embodiments obtained by those skilled in the art without creative work belong to the protection scope of this application.

The present disclosure provides a method for optimizing wind farm electric power generation using multivariable system identification. For a given wind farm wind turbine array, the method adjusts the yaw angle and the axial induction factor of each wind turbine through iterative optimization to maximize the total power generation of the wind farm, and the gradient required in each optimization iteration is obtained by using a system identification method. The optimization process does not need a wind farm mechanism model, and the procedure is simple and feasible, with high precision and strong adaptability, thus solving the problem of wake optimization for real world wind farms.

In an embodiment, the present disclosure takes the yaw angle and axial induction factor of each wind turbine in the wind farm as optimization variables (also called decision variables), and takes the total power generation of the wind turbine in the wind farm as an objective function to construct an input-output model for wind farm power optimization. In order to improve the model accuracy, the wind speed and direction are taken as measured disturbance variables. The inputs of the model are optimization variables and measured disturbance variables, and the output of the model is the total power generation of the wind farm, that is, the optimization objective function; by applying excitation signals of small amplitudes to the setpoints of the yaw angle and axial induction factor of each wind turbine, the input and output data of the system are recorded, and the dynamic linear model of the optimization model is obtained by using the collected experimental data (input and output data in the excitation signal application period); a dynamic linear model of the optimization model is obtained by using the system identification method, the model gain between yaw angle and axial induction factor of each wind turbine and the total power generation in the dynamic linear model is taken as an optimization gradient, and optimization iteration is carried out by using a gradient ascent method. For the special application scenarios of wind farms, the present disclosure provides an initial step size determination method, a variable step size iteration method and an iteration termination method for optimization iteration; an optimization variable grouping method is proposed to simplify the optimization problem; a partitioning method for processing experimental data in model identification and a corresponding experimental data slicing method are also proposed. The optimization iteration of the present disclosure does not need the mechanism model of the wind farm, and field implementations is highly feasible.

Here, the total power generation of wind farm is an unknown dynamic nonlinear function of the yaw angles, axial induction factors of all wind turbines, wind speed and wind direction of the wind farm, and the form is as follows:

$$P_{out}(t)=f(\gamma,a,\beta,v,t) \quad (1)$$

where $P_{out}$ represents the total power generation of wind turbines in the wind farm, $\gamma=[\gamma_1,\gamma_2,\ldots,\gamma_n]^T$ represents the yaw angle vector of the wind turbines in the wind farm, $a=[a_1, a_2, \ldots, a_n]^T$ represents the axial induction factor vector of the wind turbines in the wind farm, $v$ represents the wind speed of the wind farm, $\beta$ represents the wind direction angle of the wind farm, t represents the sampling time, n represents the number of the wind turbines in the wind farm, and the superscript T indicates matrix and vector transposition; with the due north in geographical coordinates is taken as 0° and clockwise as positive; here the number of input variables is 2n+2; the yaw angle $\gamma_i$ and axial induction factor $a_i$ of each wind turbine are optimization variables; the wind speed v and wind direction angle β are measurable disturbance variables. Note that the nonlinear function (1) is unknown here, and the present disclosure does not need to use this function, and the function is quoted here to explain the principle of the method. The present disclosure is a completely data-driven method without using wind farm mechanism models.

The problem of optimization of the yaw angles and axial induction factors (wake optimization) of wind turbines in the wind farm is a nonlinear program given as follows:

$$\max_{\gamma,a} P_{out}(t) = f(\gamma, a, \upsilon, \beta, t) \quad (2)$$
$$\text{s.t. } \underline{\gamma} < \gamma < \overline{\gamma}, \underline{a} < a < \overline{a}$$

where $\overline{y}$ and $\underline{y}$ represent the upper and lower bound vectors of the yaw angle of the wind turbine, $\overline{a}$ and $\underline{a}$ represent the upper and lower bound vectors of the axial induction factor of the wind turbine.

In order to simplify the expression, the two optimization vectors of γ and a are merged into one optimization vector $$\theta = \begin{bmatrix} \gamma \\ a \end{bmatrix},$$

and the optimization function can be written as $P_{out}(t)=f(\theta, \upsilon,\beta,t)$, and the optimization problem (2) can be written as:

$$\max_\theta P_{out}(t) = f(\theta, \upsilon, \beta, t) \text{ s.t. } \underline{\theta} < \theta < \overline{\theta} \quad (3)$$

Because the nonlinear function $P_{out}(t)=f(\theta,\upsilon,\beta,t)$ is unknown, in practical applications, it is difficult to solve the problem by using a mechanism model due to large model errors and high computation cost.

The present disclosure adopts a gradient ascent method for optimization, and carries out linear approximation on the current working point θ* for the dynamic nonlinear function $$P_{out}(t) = f(\theta, \upsilon, \beta, t) : P_{out}(t) - P^*_{out} \approx G(q^{-1}, \theta^*) \underbrace{\begin{bmatrix} \theta(t) \\ \upsilon(t) \\ \beta(t) \end{bmatrix}}_{u(t)} + v(t) \quad (4)$$

where $P^*_{out}$ represents a constant, and its value is the total power generation by the wind turbines of the wind farm at the current working point θ*; $P_{out}(t)$ represents the total power generation of the wind turbine of the wind farm near the current working point θ* at time t; $G(q^{-1},\theta^*)$ represents the dynamic linear model of $P_{out}(t)$ at the current working point θ*, $q^{-1}$ represents a unit delay operator, and v(t) represents an unmeasured stochastic disturbance of the system.

According to the final value theorem, the gradient of $P_{out}(t)$ for θ(t) at the working point θ* is the static gain of the dynamic linear model $G(q^{-1},\theta^*)$, namely $$\frac{\partial P_{out}(t)}{\partial \theta(t)} = G(q^{-1}, \theta^*)^T \bigg|_{q=1} = G(1, \theta^*)^T \quad (5)$$

Therefore, although the function $P_{out}(t)=f(\theta,\upsilon,\beta,t)$ is unknown, if the dynamic linear model of the working point can be obtained in some way and then the gradient can be obtained, a local optimum can be obtained by iterative optimization using a gradient ascent method. The concept of the gradient ascent method is shown in FIG. 1, which shows the optimization iterations of the yaw angle of a wind turbine. At k-th iteration, after obtaining the gradient of the working point $\theta^k$, the working point $\theta^{k+1}$ is determined by the following $$\theta^{k+1} = \theta^k + \lambda(k) * \text{sign}\left(\frac{\partial P_{out}(t)}{\partial \theta(t)}\bigg|_{\theta=\theta^k}\right) \quad (6)$$

where λ(k) represents a diagonal matrix of the step size, whose elements are the absolute values of the iteration step sizes of the yaw angle and axial induction factor of each wind turbine, and the step size is expressed as a function of the iteration number k, indicating that iteration with a variable step size will be used, sign $$\left(\frac{\partial P_{out}(t)}{\partial \theta(t)}\bigg|_{\theta=\theta^k}\right)$$

represents the sign vector of the optimization function gradient vector with elements of +1 and −1, indicating that the gradient of the corresponding yaw angle or axial induction factor of the wind turbine is positive (+1) or negative (−1).

The convergence speed of optimization iteration depends on the strategy of the iteration step size determination. In this embodiment, an initial step size determination method and a variable step size iteration method are given for the application scenarios of wind farms, but they are not limited thereto.

The method of determining the initial step size is as follows: using a large initial step size can reduce the number of optimization iterations and improve the convergence speed. For a given wind turbine, the larger the optimal yaw angle, the larger the initial step size should be; the smaller the optimal yaw angle is, the smaller the initial step size should be. Based on the literature research, the distribution of the optimal yaw angle of the wind turbine is as follows: from the windward direction, the optimal yaw angle in the area of the front row is the largest, with a typical value of 30°; the area of the middle row is intermediate, with a typical value of 20°; the area of the back row becomes smaller, with a typical value of 10°. Based on this observation, three different initial steps are used in the areas for the selection of the initial step size of the yaw angle: the area of the front row, 4.0°-10.0°; the area of the middle row, 3.0°-7.0°; 1.3°-4.0° for the area in the back row. For the selection of the initial step size of the axis inductance factor, there is no law of the optimal setting of the three areas from the literature, and the three areas use the same initial step size: 0.03-0.07.

The iteration scheme with a variable step size is as follows: when the yaw angle of the wind turbine is close to the optimal value, if the initial iterative step size is too large, the yaw angle will jump back and forth on both sides of the optimal value, and the optimization will not converge. To solve this problem, a variable step size solution is given here: at k-th iteration, if the sign of the yaw angle or axial induction factor gradient of a certain wind turbine changes, the iteration step size is divided by a number p greater than 1, and the value range of p is 1.5-4.0.

The method of optimizing iteration termination will be introduced later.

Here, the dynamic linearity model $G(q^{-1},\theta^*)$ and optimization gradient $G(1,\theta^*)^T$ will be obtained by using a multivariable system identification method. The multivariable system identification method for wind farm wake optimization is given below.

Figure 2:
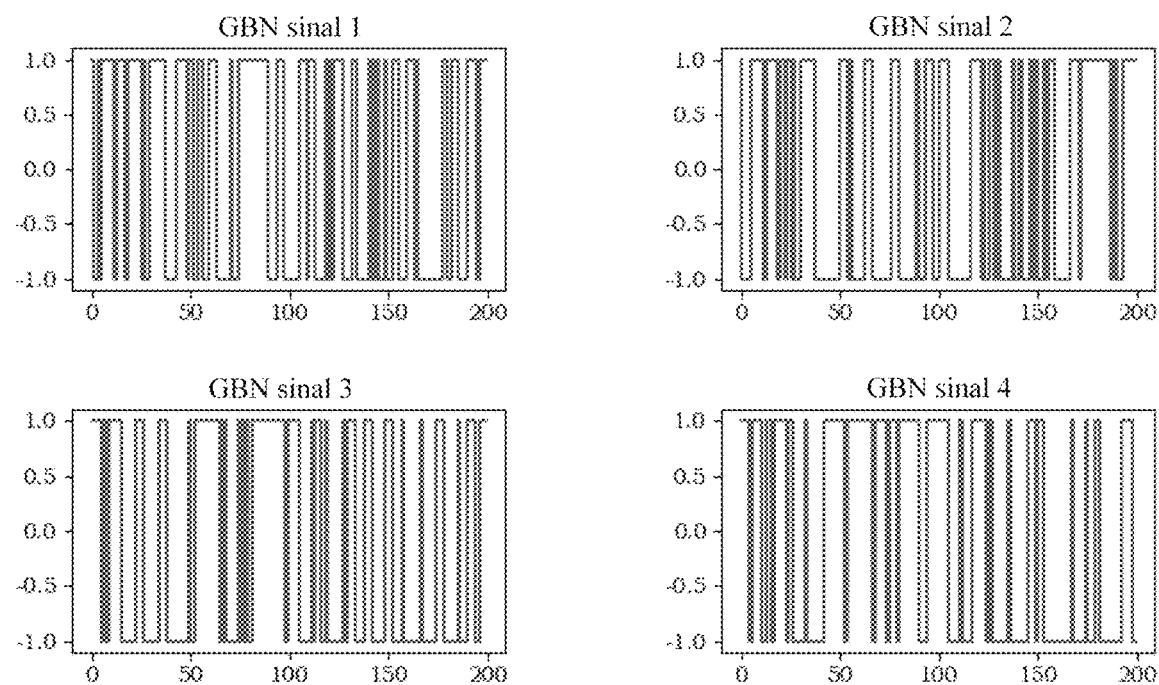
FIG. 2 shows four independent GBN excitation signals with an amplitude of 1.

First step of the system identification: identification experiment. Excitation signals are simultaneously added to the yaw angle and axial induction factors of all wind turbines, and the excitation signals use GBN (generalized binary noise) signals, as shown in Chapter 3 of [9]. Independent random GBN excitation signals are required for each optimization variable, and 4 GBN signals are shown in FIG. 2; the mean value of the GBN signals are 0; the GBN signal has two important parameters: signal amplitude and average switching time. In the identification experiment, the signal amplitude range of the yaw angle of the wind turbine is 1-5°, the signal amplitude range of the axial induction factor of the wind turbine is 0.01-0.04, and the average switching time is 5-30 min; the time range of identification experiment is 48-140 hours; the data sampling time range is 5-60 seconds.

Second step of the system identification: model identification. The yaw angle and axial induction factor with applied excitation signals, wind direction, wind speed and total power generation data of the wind farm are collected, and identified by the following method:

The parameterization of the dynamic linear model of the system at the working point $\theta^*$ in Equation (4) is as follows:

$$P_{out}(t) - P_{out}^* \approx G(q^{-1}, \theta^*) \begin{bmatrix} \theta(t) \\ \upsilon(t) \\ \beta(t) \end{bmatrix} + v(t) = \qquad (7)$$

$$\frac{1}{A(q^{-1})}[B_1(q^{-1}), B_2(q^{-1}), \ldots B_{2n+2}(q^{-1})]\begin{bmatrix} \theta(t) \\ \upsilon(t) \\ \beta(t) \end{bmatrix} + \frac{C(q^{-1})}{D(q^{-1})}e(t)$$

where $A(q^{-1})$, $B_1(q^{-1})$, $B_2(q^{-1})$, ... $B_{2n+2}(q^{-1})$, $C(q^{-1})$, $D(q^{-1})$ are polynomials of $q^{-1}$, with unknown coefficients to be determined, and e(t) represents an unknown white noise signal with zero mean value.

The unknown coefficient of each polynomial in Equation (7) are determined by minimizing the following loss function V $$V = \frac{1}{N}\sum_{t=1}^{N}\left(\frac{D(q^{-1})}{C(q^{-1})}\left\{P_{out}(t) - P_{out}^* - \frac{1}{A(q^{-1})}[B_1(q^{-1}), B_2(q^{-1}), \ldots B_{2n+2}(q^{-1})]u(t)\right\}\right)^2 \qquad (8)$$

where N represents the number of data samples. The model identification problem composed of Equations (7)-(8) is called a prediction error method, for details, please refer to Chapter 5 of [9]. The identification problem can also be solved by an asymptotic identification method, see chapter 6-7 of [9].

Third step of the system identification: error estimation of model gain. The system identification model has errors. According to the asymptotic identification method[5], error upper bounds of each model frequency can calculated. $G_j^o(q^{-1},\theta^*)$ denotes the real model (no error but unknown) of the $j^{th}$ input $u_j(t)$, $\hat{G}_j(q^{-1},\theta^*)$ denotes the identified model (with error and known) of the $j^{th}$ input $u_j(t)$, m represents the order of the model, $\Phi_v(\omega)$ represents the power spectrum of the unmeasured disturbance V(t), $\Phi_j(\omega)$ represents the power spectrum of the $j^{th}$ input $u_j(t)$, and $\omega$ is frequency, then the following is obtained (see Chapter 7 of [9]):

$$|G_j^o(e^{j\omega}) - \hat{G}_j(e^{j\omega})| \leq \overline{\Delta}_j(\omega) = 3\sqrt{\frac{m}{N}\Phi_v(\omega)/\Phi_j(\omega)} \; w.p. \; 99.9\% \qquad (9)$$

Because the time-frequency response of the model is the gain of the model when $\omega=0$, the upper bound of the error of the model gain is given by the following formula:

$$|G_j^o(1) - \hat{G}_j(1)| \leq \overline{\Delta}_j(0) = 3\sqrt{\frac{m}{N}\Phi_v(0)/\Phi_j(0)} \; w.p. \; 99.9\% \qquad (10)$$

Note that each iteration in optimization requires an identification experiment and a model identification.

The optimization iteration termination method is as follows: the upper error bound of the gain of this model is the upper error bound of the gradient. When the yaw angle of the wind turbine is close to the optimal value, the gradient becomes smaller and the relative error becomes larger. When the gradient is smaller than the upper error bound, it becomes difficult to determine the sign of the gradient. At this time, the optimization iteration should be stopped. Accordingly, the iteration termination method is given:

1. When the gradient value of the yaw angle or axial induction factor of a certain wind turbine is less than its upper error bound (Equation (10)), the iteration is suspended, that is, the yaw angle of the wind turbine is not modified in this iteration; in the subsequent iteration, when the gradient value of the yaw angle or axial induction factor is greater than its upper error bound, the iteration is restarted.

2. When the gradient values of the yaw angles or axial induction factors of all wind turbines are less than the upper error bound (Equation (10)), the optimization iteration is terminated.

Because each iteration needs one identification experiment, in order to reduce the experimental cost, the maximum number of iterations is limited, for example, the maximum number of iterations is limited to 5-15.

The above steps describe the method for optimizing wind turbine yaw angle for a given wind direction and given wind speed. However, the wind direction and speed of the real wind farm will change in wide ranges and cannot be controlled. Therefore, the optimal wind turbine yaw angles and axial induction factors should be given for different wind directions and different wind speeds. In order to optimize the wind turbine yaw angles and axial induction factors in the whole range of wind directions and speeds, the wind direction angle range of 0-360° is divided into seventy-four 5° range partitions, which are expressed as 0.0±2.5°, 5.0±2.5°, ..., 357.5±2.5°. Here, 0.0°, 5.0°, ..., 355.0° are called as center points of wind direction angle partitions; the wind speed range of 3-15 m/s is divided into four 3 m/s partitions, which are expressed as 4.5±1.5 m/s, 7.5±1.5 m/s, 10.5±1.5 m/s, 13.5±1.5 m/s. Here, 4.5 m/s, 7.5 m/s, 10.5 m/s and 13.5 m/s are called as center points of wind speed partitions. The combination of the center points of wind direction angle partitions and the center points of wind speed partitions is called as a partition center. Generally speaking, the experimental data of primary wind field identification will contain data of multiple partitions. In model identification, the data of each partition should be used to identify the corresponding model separately. The way to do this is to slice the experimental data according to the given partitions, and use multiple slices of data in the same partition for model identification. After obtaining the models of all partitions contained in the experimental data, the optimization iteration is carried out using the gradient information in the models. The identification experiment, model identification and optimization iteration will be repeated until the optimization iteration is terminated.

For a given wind farm, the optimal yaw angle and axial induction factor of each wind turbine in each partition are obtained after all the partitions covered by the operation have completed the identification experiment, model identification and optimization iteration. A look-up table is composed of the optimal yaw angle and axial induction factor of each wind turbine in all partitions for online optimization. During optimal operation, there are two ways for each wind turbine to use its optimization table: (1) using the optimal yaw angle and axial induction factor of each partition in the partition, which is simple and has little change in the yaw angle setting of the wind turbine; (2) for a given wind direction angle and wind speed value, according to the distances from the center points of two partitions, the linear interpolations of the optimal yaw angle and axial induction factor of two partitions are used, which is more accurate, but the setpoints of the yaw angle and axial induction factor of the wind turbine will change continuously. When the wind speed is less than 3 m/s and more than 15 m/s, the optimal values of yaw angle and axial induction factor near the boundary partitions are used.

In the process of optimizing the yaw angles and axial induction factors of wind turbines in a real wind farm, it is necessary to send setpoints of yaw angles and axial induction factors to wind turbines in the wind farm in the data center or control room, to the yaw angle controllers and axial induction factor controllers in the PLCs (program logic controls).

The method of the present disclosure contains many optimization variables (decision variables), the number of which is 2n times of the number n of wind turbines. If the wind farm has 100 wind turbines, there are 200 optimization variables. Too many optimization variables will affect the quality of the identification model, and then affect the quality of optimization. Because the amplitude of GBN excitation signals cannot be too large, and the number of optimization variables is large, then each variable contains relatively little information. The method of wind turbine grouping optimization is proposed below to reduce the number of optimization variables. Reducing the number of optimization variables can also improve the convergence speed of optimization. It is assumed that after the electric power generation of a wind farm is optimized, the optimization results of neighboring wind turbines are the same or very close. If the yaw angles and axial induction factors of these wind turbines are adjusted together as one optimization variable, the number of optimization variables will be greatly reduced. For a given wind farm, the grouping of wind turbines is related to the wind direction, and there are different groups for different wind directions. A wind turbine grouping method is to consider wind direction, each row of wind turbines perpendicular to the wind direction is selected as a wind turbine grouping. For example, a wind farm has 100 wind turbines arranged in a 10×10 square with four sides facing southeast, northwest and northwest. For the due west wind, 100 wind turbines can be divided into 10 rows facing west, that is, 10 wind turbines can be grouped. In this way, the number of optimization variables is reduced from 200 before wind turbine grouping to 20 after wind turbine grouping, which will greatly improve the accuracy of identification model, shorten the identification experiment time, reduce the experiment cost and improve the convergence speed of optimization. A second grouping method is to put a block of neighboring wind turbines in a group without concerning the wind direction; and the number of wind turbines in a group can vary from 2 to 10 according to the wind turbine distribution in the wind farm.

According to the aerodynamic principle, for a given wind direction, the wake of the wind turbines in the last row of the wind turbine array does not affect the total power generation of the wind farm, therefore these wind turbines should be set to a greedy operation mode, that is, the yaw angle is 0° and the axial induction factor is 0.33; at the same time, these wind turbines in the last row do not participate in the optimization of wind farm electric power generation, thus further simplifying the optimization problem. Note that the wind turbines in the "last row" are different for different wind directions.

When this method is implemented in the field, in order to reduce the implementation cost and simplify the optimization problem, the axial induction factors of wind turbines can be fixed in the greedy operation mode of 0.33, and only the yaw angles be optimized. On the contrary, the yaw angles of wind turbines can be fixed in the greedy operation mode of 0°, and only the axial induction factors be optimized. Therefore, this method includes the method for optimizing wind farm electric power generation by only adjusting the yaw angles of wind turbines; it also includes the method for optimizing wind farm electric power generation that only adjusts the axial induction factors of wind turbines.

Figure 3:
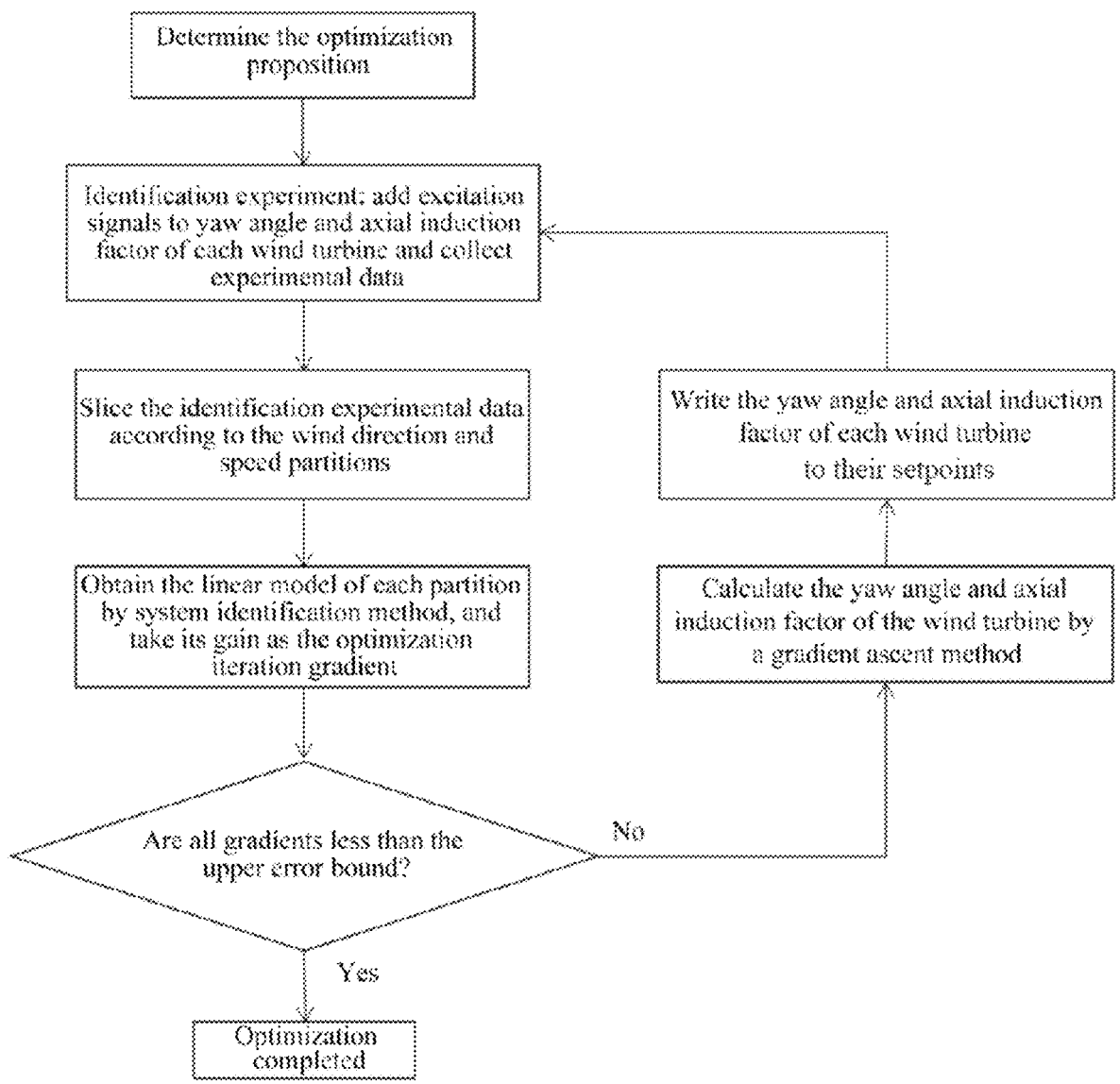
FIG. 3 is a flowchart of the optimization steps of the present disclosure.

To sum up, the complete step flow of the present disclosure is shown in FIG. 3.

In order to help understand the purpose, features and advantages of the present disclosure, a mechanism model simulation system is used to explain and demonstrate the specific embodiments of the present disclosure.

The mechanism model FLORIS (https://www.nrel.gov/wind/floris.html) is a tool developed by NREL (National Renewable Energy Laboratory) of the United States to simulate and optimize the performance of wind farms. FLORIS is a static mechanism model, which can simulate and calculate the interaction of wind turbines and the overall wind farm performance under different environmental conditions. With the help of FLORIS, researchers can study the layout and operation optimization of wind turbines by simulating the actual wind field conditions. In this example, the simulation data of FLORIS model is used as the measured data of the actual wind farm, and the optimization method proposed by this method is used to optimize the yaw angle of the wind turbine. The optimization results are first compared with the default yaw angle of 0°, and then compared with the results of the optimization method of the FLORIS model.

Figure 4:
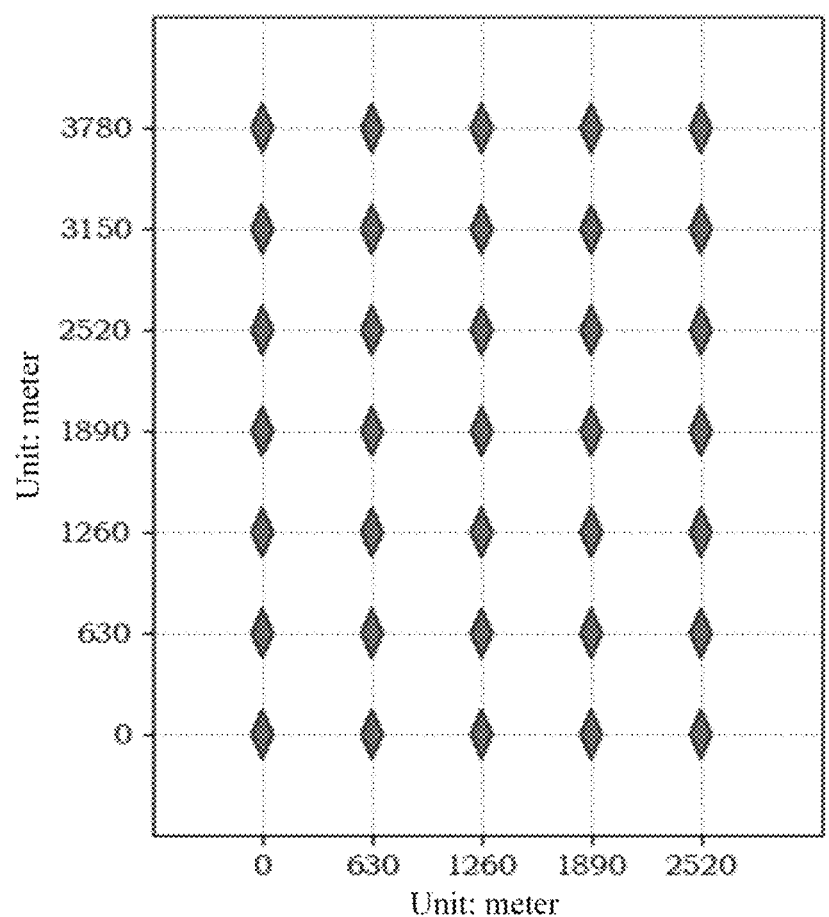
FIG. 4 is a schematic diagram of a wind farm with an array of 7×5 wind turbines.

For the simulation study, a 7×5 wind turbine array is constructed as shown in FIG. 4, the diameter of the wind turbines is D=164 m, and the spacing between adjacent wind turbines is 7D. In the optimization process, the total power generation of 35 wind turbines (F(1,1)-F(7,5)) is used as the objective function, and the optimization variables are the yaw angles of 35 wind turbines; the axial induction factors all turbines are fixed. In order to make the simulation optimization more realistic, wind speed variation is introduced, ranging from 6.5 m/s to 9.5 m/s; at the same time, an unmeasured disturbance of 10% relative to the standard deviation of the total power of the wind farm when the initial yaw angle is 0 is applied on the generated output, and the expression of the disturbance signal is:

$$v_{Power}(t) = \frac{1 + 0.2q^{-1}}{1 - 0.95q^{-1}} e(t),$$

where e(t) represents a Gaussian white noise signal with a mean value of 0 and a standard deviation of 1, and the disturbance signal $v_{power}(t)$ at the output (total power) is obtained by low-pass filtering e(t), and its standard deviation is adjusted to be equal to 10% of the standard deviation of the total power of the wind farm when the initial yaw angle is 0.

In order to simplify the demonstration process, the axial induction factor of the wind turbine is fixed, and the yaw angles of the wind turbines with three fixed wind directions are optimized. This example simulates three working conditions, namely west wind, south wind and southwest wind.

1. Independent GBN excitation signals were added to the setpoints of the yaw angles of 35 wind turbines, as shown in FIG. 2, and the identification experiment time for each iteration was 500 sampling points. Because a static model was used, the sampling time was irrelevant. The amplitudes of the excitation signals were 2°.

2. The experimental data were collected, and after the experiment, the input and output data were used to identify the linear model using the system identification method described before. The model gains were gradients for the optimization iteration. If the iteration termination condition was met, the iteration was stopped; otherwise, proceeding to step 3.

3. According to the obtained gradients, the yaw angle of each wind turbine was calculated according to Equation (6), and the initial iteration step size was 4°.

4. The updated wind turbine yaw angles were taken as the new setpoints and steps 1-3 were repeated.

Figure 5:
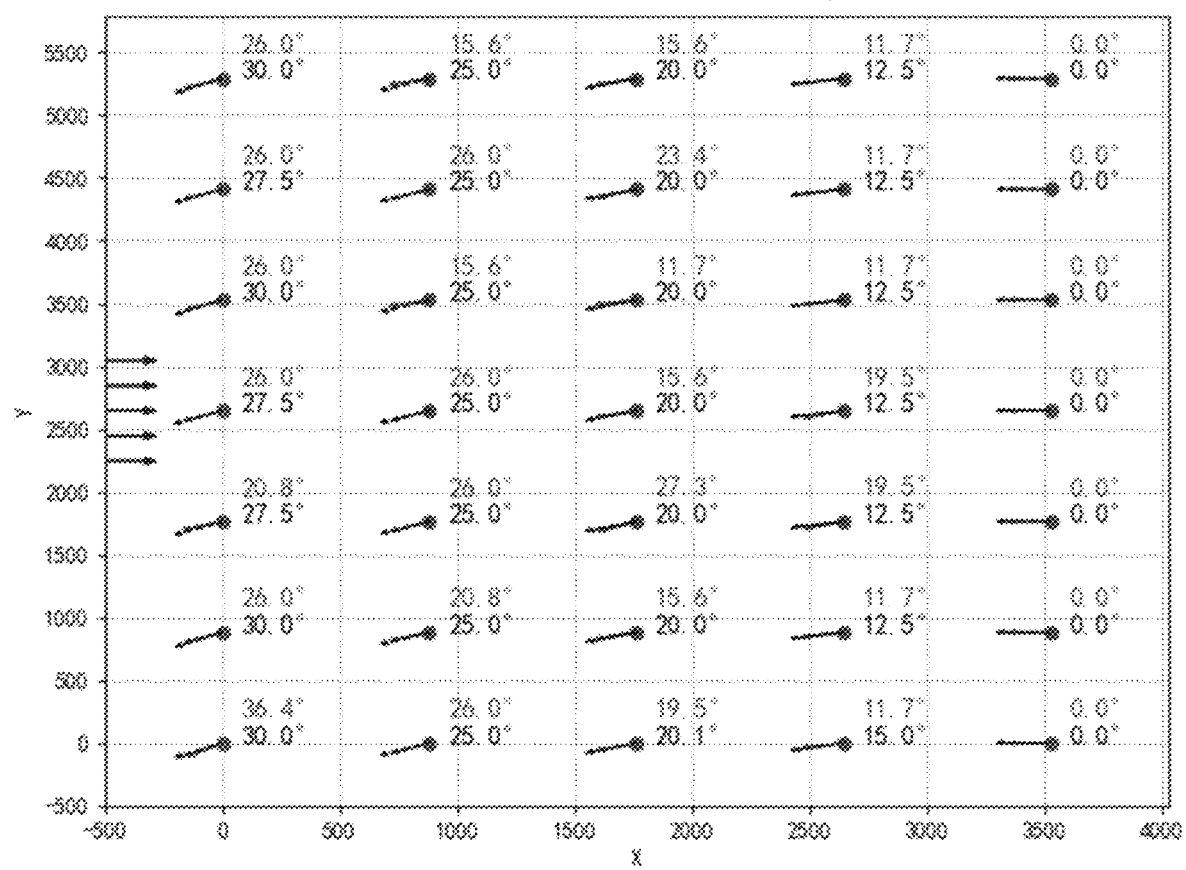
FIG. 5 shows the optimization results of the yaw angles of wind turbines in west wind, with red line being the result of this method and black line being the result of FLORIS.

A total of 15 iterations were carried out, and total power of the three situations were calculated under the condition of a wind speed of 8 m/s, and the results are as follows:

The yaw angle optimization result in west wind is shown in FIG. 5. Under the default yaw angle setting of 0°, the total power generation of the wind farm was 32.79 MW. After the optimization by this method, the total power generation was 39.93 MW, which is increased by 21.8%. Using the optimization method of the FLORIS model, the total power generation was 40.38 MW, which was increased by 23.1%.

Figure 6:
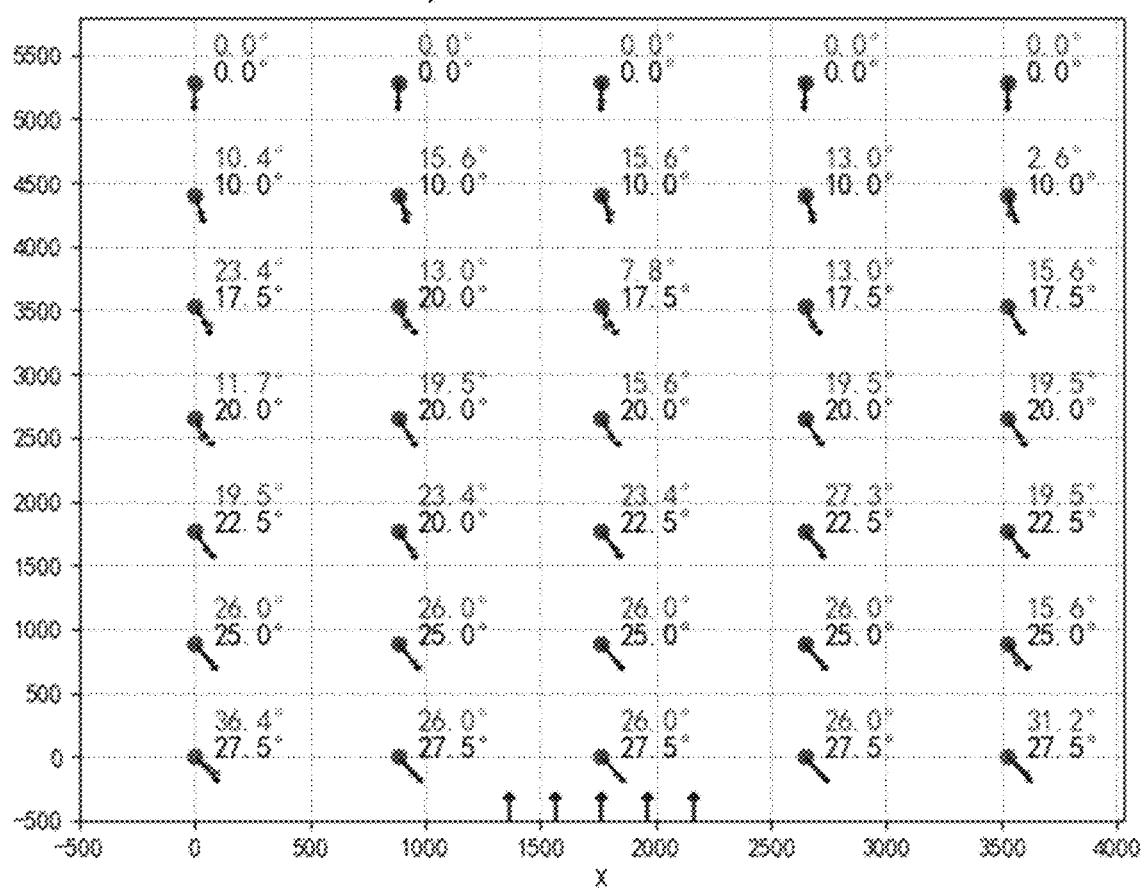
FIG. 6 shows the optimization results of the yaw angles of the wind turbines in south wind, with red line being the result of this method and black line being the result of FLORIS.

The yaw angle optimization result in south wind is shown in FIG. 6. Under the default yaw angle setting of 0°, the total power generation of the wind farm was 31.54 MW; after the optimization by this method, the total power generation was 40.39 MW, which was increased by 28.1%; using the optimization method of the FLORIS model, the total power generation was 40.78 MW, which was increased by 29.3%.

Figure 7:
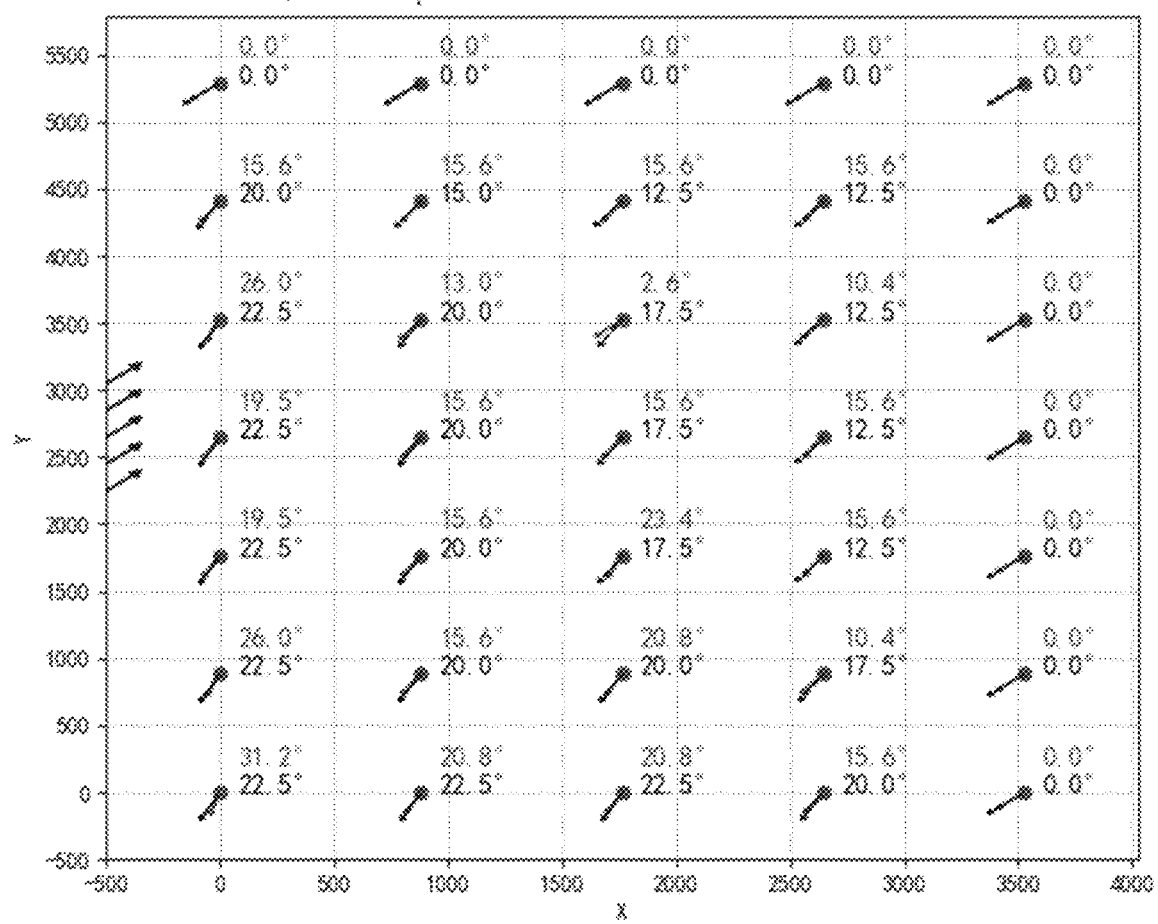
FIG. 7 shows the optimization results of the yaw angles of wind turbines in southwest wind, with red line being the result of this method, and black line being the result of FLORIS.

The yaw angle optimization result in southwest wind is shown in FIG. 7. Under the default yaw angle setting of 0°, the total power generation of the wind farm was 41.87 MW. After optimization by this method, the total power generation was 45.19 MW, which was increased by 7.9%; using the optimization method of the FLORIS model, the total power generation was 45.49 MW, which was increased by 8.6%.

The results of the simulation study are given in the following table.

TABLE 1

Comparison of simulated optimization results of FLORIS model

| Wind direction angle | Optimization method | | |
| --- | --- | --- | --- |
| | yaw angle of 0° | The optimization result of the method of the present disclosure | FLORIS model optimization results |
| 270° due west wind | 32.79 MW | 39.93 MW (+21.8%) | 40.38 MW (+23.1%) |
| 180° due south wind | 31.54 MW | 40.39 MW (+28.1%) | 40.78 MW (+29.3%) |
| 225° southwest wind | 41.87 MW | 45.19 MW (+7.9%) | 45.49 MW (+8.6%) |

The simulation results using the FLORIS model show that the optimization results of this method are highly consistent with the optimization method based on the FLORIS model, which shows the feasibility and effectiveness of this method. Because this method uses the system identification method to calculate the optimization iteration gradient without the need of the wind farm mechanism model, it can solve the problem of large-scale real-life wind farm power generation optimization. While the method based on the mechanism model cannot be used to solve the problem of large-scale real-life wind farm power generation optimization due to its low precision and high computation cost.

The above-mentioned embodiments are used to explain, rather than to limit the present disclosure. Any modification and change made to the present disclosure within the scope of protection of the spirit and claims of the present disclosure fall within the scope of protection of the present disclosure.

What is claimed is:

1. A method for optimizing wind farm power generation using multivariable system identification, comprising the following steps:
    constructing an optimization model by taking yaw angles and axial induction factors of all wind turbines in a wind farm as optimization variables and a total power generation of the wind farm as objective function, wherein the optimization model is a dynamic nonlinear function $P_{out}(t)=f(\theta,v,\beta,t)$, where $$\theta = \begin{bmatrix} \gamma \\ a \end{bmatrix}$$

is a vector of optimization variables, $\gamma$ is a yaw angle vector of the wind turbines, a is an axial induction factor vector of the wind turbines, v is wind speed of the wind farm, $\beta$ is the wind direction angle of the wind farm, and t is the sampling time;

carrying out linear approximation on the dynamic nonlinear function at current working point $\theta^*$:

$$P_{out}(t) - P_{out}^* \approx G(q^{-1}, \theta^*) \underbrace{\begin{bmatrix} \theta(t) \\ v(t) \\ \beta(t) \end{bmatrix}}_{u(t)} + v(t) \quad (1)$$

where $P^*_{out}$ is a constant, with a value being the total power generation of the wind farm at the current working point $\theta^*$; $P_{out}(t)$ is the total power generation of the wind farm near the current working point $\delta^*$ at time t; $G(q^{-1},\theta^*)$ is a dynamic linear model of the current working point $\theta^*$, $q^{-1}$ is the unit delay operator, and v(t) is an unmeasured stochastic disturbance of the system;

wherein the gradients of $P_{out}(t)$ for $\theta(t)$ at the current working point $\theta^*$ are the static gains of the dynamic linear model $G(q^{-1},\theta^*)$, namely:

$$\frac{\partial P_{out}(t)}{\partial \theta(t)} = G(q^{-1}, \theta^*)^T \bigg|_{q=1} = G(1, \theta^*)^T \quad (2)$$

obtaining a local optimum through iterative optimization using a gradient ascent method; and applying an excitation signal to the setpoints of the yaw angles and axial induction factors of all wind turbines, collecting experimental data, obtaining a dynamic linear model of the optimization model by using a system identification method, taking the static model gains between the yaw angles and axial induction factors of wind turbines and the total power generation in the dynamic linear model as optimization gradients, performing optimization iteration using a gradient ascent method, and optimally adjusting the yaw angle and axial induction factor of the wind turbines;

wherein obtaining the dynamic linear model and the optimization gradients by using the system identification method further comprises the following substeps:

(i) identification experiment: simultaneously applying independent random excitation signals to all optimization variables;

(ii) model identification: collecting the optimization variables where excitation signals are added, measurable disturbance variables and power generation data of the wind farm, and using the following method for the model identification:

parameterizing the dynamic linear model as follows:

$$P_{out}(t) - P^*_{out} \approx G(q^{-1}, \theta^*)\begin{bmatrix}\theta(t)\\ \upsilon(t)\\ \beta(t)\end{bmatrix} + v(t) = \quad (3)$$

$$\frac{1}{A(q^{-1})}[B_1(q^{-1}), B_2(q^{-1}), \ldots B_{2n+2}(q^{-1})]\begin{bmatrix}\theta(t)\\ \upsilon(t)\\ \beta(t)\end{bmatrix} + \frac{C(q^{-1})}{D(q^{-1})}e(t)$$

where $A(q^{-1})$, $B_1(q^{-1})$, $B_2(q^{-1})$, ... $B_{2n+2}(q^{-1})$, $C(q^{-1})$, $D(q^{-1})$ are polynomials of $q^{-1}$, with unknown coefficients to be determined, and e(t) is an unknown white noise signal with a mean value of zero; and determining the unknown coefficients of each polynomial in equation (3) by minimizing the following loss function:

$$V = \frac{1}{N}\sum_{t=1}^{N}\left(\frac{D(q^{-1})}{C(q^{-1})}\left\{P_{out}(t) - P^*_{out} - \frac{1}{A(q^{-1})}[B_1(q^{-1}), B_2(q^{-1}), \ldots B_{2n+2}(q^{-1})]u(t)\right\}\right)^2 \quad (4)$$

where N is the number of data samples; and (iii) model gain error estimation, comprising:

calculating an upper error bound of a frequency of each dynamic linear model according to an asymptotic identification method, wherein a frequency response of the dynamic linear model at zero frequency is the model gain, obtaining an upper error bound of the model gain, and when all the optimization gradients become smaller than their upper error bounds, stopping the optimization iteration, and controlling each wind turbine to operate using the obtained optimal yaw angles and axial induction factors.

2. The method according to claim 1, wherein the wind speed and a wind direction are taken as the measurable disturbance variables, an input of the optimization model is the optimization variables and the measured disturbance variables, and an output of the optimization model is the total power generation of the wind farm.

3. The method according to claim 1, wherein a method for determining an initial step size of the optimization iteration comprises: dividing the wind turbines into multiple rows from front to back according to the incoming wind direction, with the initial step size of the yaw angle of each area being decreased in turn, and an initial step size of the axial induction factor being the same.

4. The method according to claim 1, wherein the optimization iteration adopts a variable step-size iteration, further comprising: in a certain iteration process, when the gradient sign of an optimization variable changes, reducing its step-size and continuing the optimization iteration.

5. The method according to claim 1, wherein a termination method of the optimization iteration further comprises: when a gradient value of a yaw angle or an axial induction factor of the wind turbines is less than its upper error bound, suspending its optimization iteration; when the gradient value of the yaw angle or the axial induction factor is greater than the upper error bound in subsequent iterations, restarting the optimization iteration; and when gradients of the yaw angles or the axial induction factors of all wind turbines are less than their upper error bounds, terminating the optimization iteration.

6. The method according to claim 1, further comprising: dividing a wind direction angle range and a wind speed range into several partitions, respectively, and determining center points of the partitions; slicing the experimental data according to the partitions, and carrying out the model identification for the experimental data of each partition, respectively; after obtaining models of all partitions comprised in the experimental data, carrying out the optimization iteration by using the gradient information in the models; and repeating the identification experiment, the model identification and the optimization iteration until the optimization iteration is terminated.

7. The method according to claim 6, further comprising: forming optimal yaw angles and axial induction factors of all partitions of each wind turbine into an optimization table, wherein during an optimization operation, the optimization table is used in two manners: using the optimal yaw angle and axial induction factor of the partition in the each partition in each partition, or using linear interpolations of the optimal yaw angles and axial induction factors of two partitions according to distances from the center points of two partitions for given wind direction angle and wind speed value.

8. The method according to claim 1, wherein grouping and optimizing the wind turbines in the wind farm comprises: for a certain wind direction, selecting each row of wind turbines perpendicular to the wind direction as a wind turbine group, taking the yaw angles of all wind turbines in each group as an optimization variable, and taking the axial induction factors of all wind turbines as an optimization variable, and adjusting them together; and setting the wind turbines in the last row to a greedy operation mode, that is, the yaw angle is 0°, the axial induction factor is 0.33, and these wind turbines do not participate in power generation optimization of the wind farm, wherein a second grouping method is to put a block of neighboring wind turbines in a group without concerning the wind direction, and a number of the wind turbines in a group is capable of varying from 2 to 10 according to a wind turbine distribution in the wind farm.

\* \* \* \* \*